UNITED STATES PATENT OFFICE.

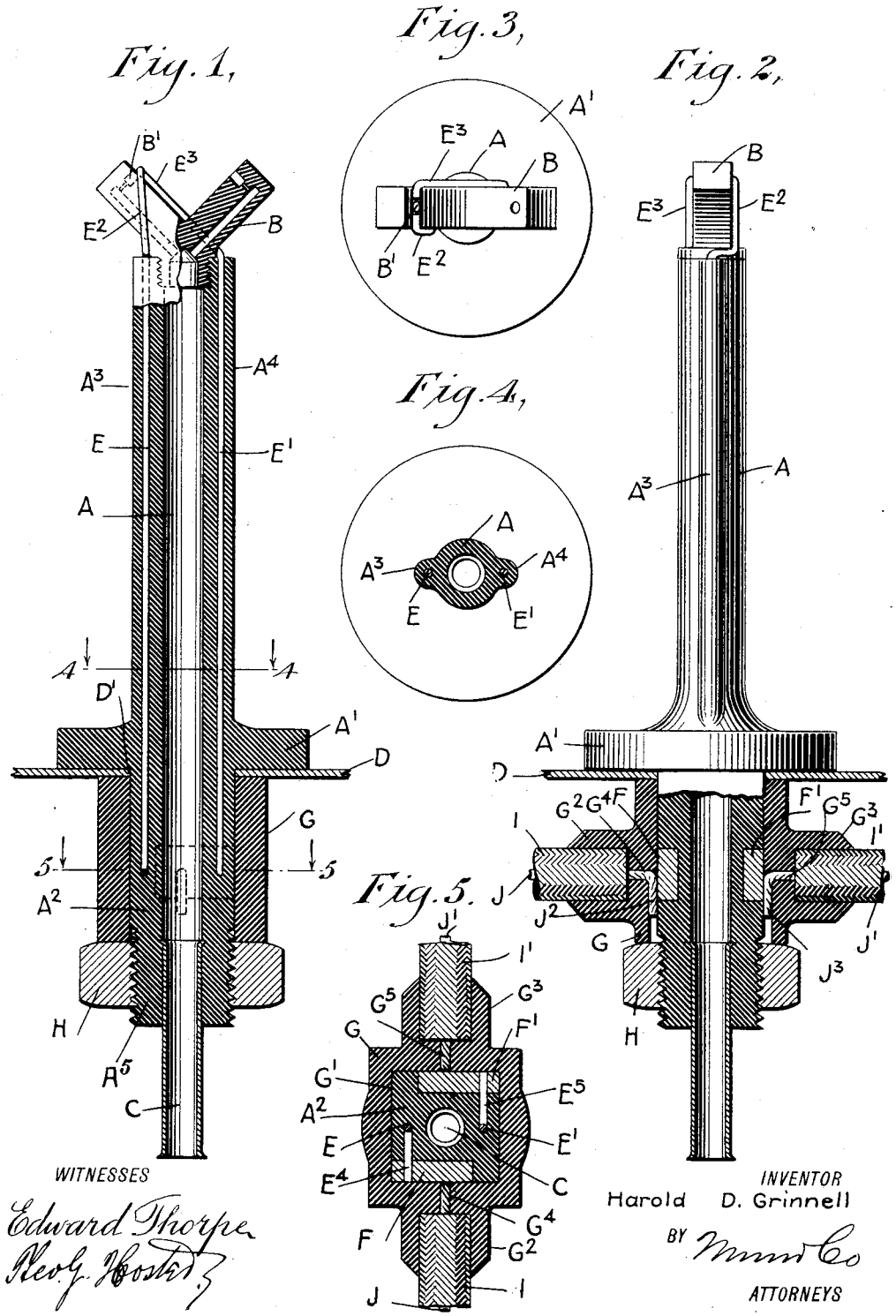

HAROLD D. GRINNELL, OF PITTSFIELD, MASSACHUSETTS.

COMBINATION GAS-BURNER AND ELECTRIC GAS-IGNITER.

1,040,937. Specification of Letters Patent. Patented Oct. 8, 1912.

Application filed June 6, 1912. Serial No. 702,038.

*To all whom it may concern:*

Be it known that I, HAROLD D. GRINNELL, a citizen of the United States, and a resident of Pittsfield, in the county of Berkshire and State of Massachusetts, have invented a new and Improved Combination Gas-Burner and Electric Gas-Igniter, of which the following is a full, clear, and exact description.

The object of the invention is to provide a new and improved combination gas burner and electric gas igniter designed for use on acetylene or other gas lamps employed for illuminating purposes on automobiles and other places, and arranged to prevent the electric wires from being disturbed and to insure a proper transmission of the electricity to the electrodes employed for producing a spark in the path of the gas issuing from the burner of the lamp to ignite the said gas whenever it is desired to use the lamp for illuminating purposes. In order to accomplish the desired result use is made of a burner tube of an insulated material and provided with a burner at one end and connected at the other end with a gas supply, electric wires embedded in the said tube and terminating in electrodes extending on opposite sides of a burner orifice, contact plates embedded in the said burner tube and to which the said wires are secured, and a sleeve slidably held on the burner tube and adapted to receive the ends of lines of wires for engagement with the said contact plates.

A practical embodiment of the invention is represented in the accompanying drawings forming a part of this specification, in which similar characters of reference indicate corresponding parts in all the views.

Figure 1 is a sectional elevation of the combination gas burner and electric gas igniter, parts being in elevation; Fig. 2 is a cross section of the same, parts being in elevation; Fig. 3 is a plan view of the same; Fig. 4 is a sectional plan view of the same on the line 4—4 of Fig. 1; and Fig. 5 is a similar view of the same on the line 5—5 of Fig. 1.

A burner tube A of an insulated material, such as porcelain, hard rubber and the like, supports at its upper end a burner B of lava or the like, and in the form of an acetylene gas burner, as indicated in the drawings. In the lower end of the burner tube A is embedded a metal tube C projecting below the lower end of the tube to permit of conveniently making a connection with the source of gas supply by a hose tube or other similar connection. The burner tube A is provided at its lower end with an annular flange A′ seated on the upper surface of the lamp casing D provided with an oblong opening D′ through which extends the lower or base end A² of the burner tube A and which base end A² is of polygonal shape corresponding to the opening D′ so that the tube A is held against turning on the lamp casing D. The burner tube A is provided at its sides with integral ribs A³, A⁴ in which are embedded wires E, E′ extending beyond the upper ends of the tube A to form electrodes E², E³ having their ends arranged on opposite sides of one of the burner orifices B′ so that when a spark is had between the electrodes and gas issues out of the orifice B′ then such gas is ignited. The lower ends of the wires E and E′ terminate in angular extensions E⁴, E⁵ secured to contact plates F and F′ embedded in the base end A² of the burner tube A at opposite sides thereof so that the outer faces of the base F and F′ are flush with the corresponding sides of the base end A², as will be readily understood by reference to Figs. 2 and 5.

A sleeve G having a polygonal portion G′ corresponding to the polygonal end A² of the tube A is mounted to slide on the end A² and abuts against the under side of the casing D, and on the lower threaded end A⁵ of the base end A² screws a nut H against the under side of the sleeve G so as to force the same upward in firm contact with the lamp casing D to securely fasten the burner tube A in position on the lamp casing B. The sleeve G is made of insulating material and is provided on opposite sides with bosses G², G³ recessed for receiving the insulations I, I′ of the line wires J, J′, and which line wires J, J′ have their ends J², J³ extended through apertures G⁴, G⁵ formed in the sleeve G directly opposite the contact plates F and F′. The lower end of the portion G′ in the sleeve G is somewhat enlarged for the reception of the ends J² and J³, as plainly indicated in Fig. 2, to permit of bending the said ends with a view to insure firm contact with the contact plates F and F′ at the time the sleeve G is placed in position on the base end A² of the burner tube, and is moved to final position on screwing up the nut H.

By the arrangement described the connections of the line wires J, J′ with the contact plates F, F′ and the connections of the latter with the electric wires E, E' is wholly within the burner tube and its sleeve G and consequently said connections, contact plates and wires are not liable to be disturbed by outside influences, and only the electrodes E² and E³ project to the outside at the burner B for the purpose previously mentioned.

The combination gas burner and electric gas igniter shown and described is very simple and durable in construction and the parts can be readily assembled and placed in position on the lamp casing in the manner above set forth.

Having thus described my invention, I claim as new and desire to secure by Letters Patent:

1. A combination gas burner and electric gas igniter, comprising a burner tube of an insulated material, a burner held on the said tube, electric wires embedded in the said tube and terminating in electrodes extending on opposite sides of a burner orifice, contact plates embedded in the said burner tube and to which the said wires are attached, and a sleeve slidable on the burner tube and adapted to receive the ends of the line wires for engagement with the said contact plates.

2. A combination gas burner and electric gas igniter, comprising a burner tube arranged for connection at its entrance end with a source of gas supply and provided at its other end with a burner, wires embedded in the wall of the said tube and terminating in electrodes having their ends on opposite sides of a burner orifice, contact plates embedded in the entrance end of the said tube and to which the said wires are secured, and a sleeve slidable on the entrance end of the tube and provided with apertured bosses for the reception of conductors, the bosses being in register with the said contact plates and the said bosses being adapted to receive electrical conductors for engagement with the said plates.

3. In a combination gas burner and electric gas igniter, the combination with a lamp casing having an opening, of a burner tube having a flange and a polygonal base passing through the said casing opening, the said flange being seated on the top of the said casing, a burner on the upper end of the said tube, wires embedded in the wall of the said tube and having their upper ends extended onto the said burner to form electrodes on opposite sides of a burner orifice, contact plates embedded in the base of the tube and to which the lower ends of the said wires are attached, a sleeve having a polygonal bore slidingly fitting onto the base of the tube and abutting against the under side of the lamp casing, the said sleeve having apertures in register with the said contact plates, the apertures being adapted to receive the ends of line wires to contact with the said contact plates, and a nut screwing on the lower end of the said base and against the said sleeve.

In testimony whereof I have signed my name to this specification in the presence of two subscribing witnesses.

HAROLD D. GRINNELL.

Witnesses:
  MARY K. MURPHY,
  NELSON A. FOOT.

---

Copies of this patent may be obtained for five cents each, by addressing the "Commissioner of Patents, Washington, D. C."